M. OBERMILLER.
FAUCET.
No. 179,596. Patented July 4, 1876.
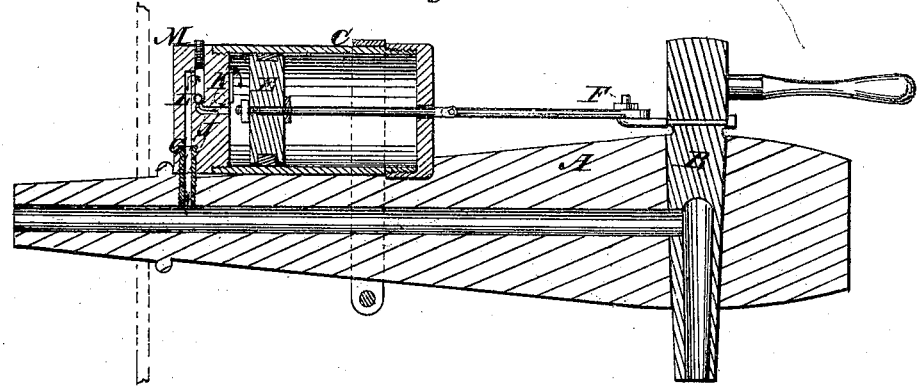
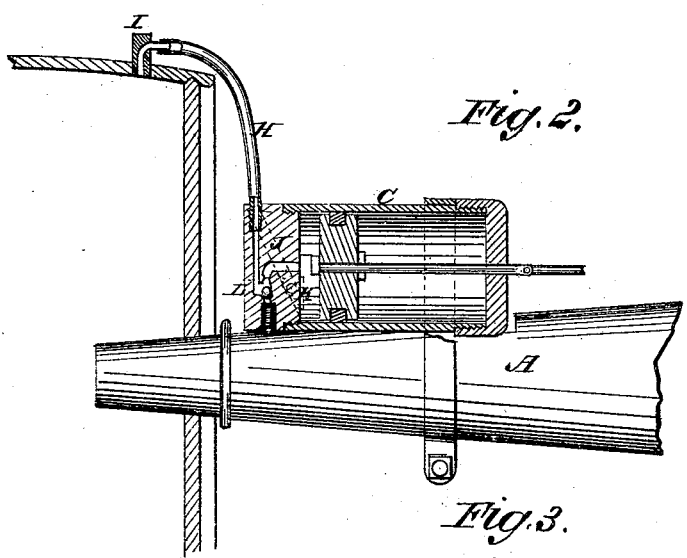
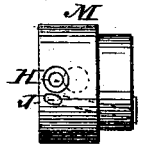
WITNESSES:
Francis McArdle
John Goethals
INVENTOR:
M. Obermiller
BY
ATTORNEYS.

UNITED STATES PATENT OFFICE.

MINRAD OBERMILLER, OF TOLEDO, OHIO.

IMPROVEMENT IN FAUCETS.

Specification forming part of Letters Patent No. 179,596, dated July 4, 1876; application filed May 1, 1876.

*To all whom it may concern:*

Be it known that I, MINRAD OBERMILLER, of Toledo, Lucas county, Ohio, have invented a new and Improved Faucet, of which the following is a specification:

My invention relates to a pump attached to a faucet, contrived in such a manner that when the faucet is opened it forces air into the barrel, either through the faucet or a tap fitted in the barrel.

Figure 1 is a sectional elevation of the faucet, showing the arrangement for forcing the air through the faucet. Fig. 2 is a section, showing it arranged to force the air in through a tap fitted in the barrel; and Fig. 3 is a detail of the pump.

Similar letters of reference indicate corresponding parts.

A is the stem, and B the cock, of the faucet, which may be of wood or metal. C is the cylinder of an air-pump, the piston E of which is connected to an arm, F, of the cock; or it may be geared by a rack and pinion, so that when the cock is turned it will work the piston to force the air into the faucet through passage G, or directly into the barrel through a flexible pipe, H, and a tap, I, fitted in the barrel, either in the head or side. The air enters the pump through passage J, (dotted,) which is closed by a valve, K, when the air is being forced into the barrel, and there is a ball check-valve, L, in the passage to the faucet or barrel, to close and prevent the escape of air or gas into the pump. The air passages and valves are fitted in a head, M, to which the cylinder is attached.

The pump-cylinder may be cast together with the faucet A, or it may be attached in any way.

Having thus described my invention, I claim as new and desire to secure by Letters Patent—

The faucet A and the spigot B, having arm connected with piston-rod of air-pump, in combination with the cylinder, having a head, M, provided with valved air-passages, as and for the purpose specified.

MINRAD OBERMILLER, M. D.

Witnesses:
  IRWIN I. MILLARD,
  A. W. GLEASON.